(12) United States Patent
Prakash et al.

(10) Patent No.: US 7,522,761 B2
(45) Date of Patent: Apr. 21, 2009

(54) SYSTEM AND METHOD FOR DETECTING A STREAK IN A COMPRESSED GRAY SCALE IMAGE

(75) Inventors: Ravinder Prakash, Concord, NC (US); Madhura Sathe, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 11/219,204

(22) Filed: Sep. 2, 2005

(65) Prior Publication Data

US 2007/0053575 A1 Mar. 8, 2007

(51) Int. Cl.
*G06K 9/00* (2006.01)
*G06K 9/36* (2006.01)
*G06K 9/40* (2006.01)

(52) U.S. Cl. .................. 382/137; 382/250; 382/275
(58) Field of Classification Search .......... 382/199, 382/246, 275
See application file for complete search history.

(56) References Cited

U.S. PATENT DOCUMENTS

| | | | |
|---|---|---|---|
| 4,491,963 A | 1/1985 | Bellemare | |
| 5,917,957 A | 6/1999 | Ichikawa | |
| 6,023,334 A | 2/2000 | Itagaki et al. | |
| 6,335,982 B1 | 1/2002 | Arai et al. | |
| 6,393,161 B1 | 5/2002 | Stevenson et al. | |
| 6,628,842 B1 | 9/2003 | Nagao | |
| 6,667,815 B1 | 12/2003 | Nagao | |
| 6,717,622 B2 | 4/2004 | Lan | |
| 6,823,089 B1* | 11/2004 | Yu et al. | 382/268 |
| 7,058,236 B2* | 6/2006 | Ohashi | 382/275 |
| 7,167,580 B2* | 1/2007 | Klein et al. | 382/112 |
| 7,289,679 B2* | 10/2007 | Prakash | 382/250 |
| 7,388,989 B2* | 6/2008 | Wang | 382/199 |
| 2004/0136603 A1* | 7/2004 | Vitsnudel et al. | 382/254 |
| 2006/0182331 A1* | 8/2006 | Gilson et al. | 382/137 |

FOREIGN PATENT DOCUMENTS

| | | |
|---|---|---|
| JP | 11225346 A | 8/1999 |
| JP | 2000209505 | 7/2000 |
| JP | 2002262083 A | 9/2002 |

OTHER PUBLICATIONS

Ravi Prakash et al, Enhanced JPEG Compression of Documents,2001,IEEE,0-7803-6725-1,494-497.*
Ravi et al, Enhanced JPEG Compression of documents, 2001, IEEE, 0-7803-6725-1, 494-497.*
Baker, G.N. et al., "All-Points-Addressable Printing Improvement," IBM Technical Disclosure Bulletin, Jan. 1986, vol. 28, No. 8, pp. 3255-3256.

* cited by examiner

*Primary Examiner*—Jingge Wu
*Assistant Examiner*—Jayesh A Patel
(74) *Attorney, Agent, or Firm*—Douglas Lashmit Hoffman Warnick LLC

(57) ABSTRACT

A system and method for detecting a streak in a JPEG image. A system is provided that includes an extraction system for extracting a DC value from each cell block in the compressed image; an identification system for identifying a peak DC value in each rank of cell blocks within the compressed image; and an analysis system for analyzing the peak DC values to determine if a streak exists in the compressed image.

5 Claims, 5 Drawing Sheets

SYSTEM AND METHOD FOR DETECTING A STREAK IN A COMPRESSED GRAY SCALE IMAGE

BACKGROUND OF THE INVENTION

1. Technical Field

The present invention relates generally to image processing, and more specifically relates to a system and method for detecting a streak in a gray scale image, such as an imaged check.

2. Related Art

With the passage of the Check 21 Act in 2004, the bank of first deposit is now allowed to send an electronic image, in lieu of an actual item (e.g., a paper check), for collection. In order to process an electronic image of a check, the image must be of sufficient quality. One of the quality attributes, as listed in ANSI 9.37, type 54 standard, is the absence of image streaks. Unfortunately, no automated techniques currently exist for effectively identifying streaks in such an image.

Accordingly, a need exists for an automated system for detecting a streak in an electronic document image.

SUMMARY OF THE INVENTION

The present invention addresses the above-mentioned problems, as well as others, by providing a system and method for detecting a streak in a gray scale document image.

In a first aspect, the invention provides a streak detection system for detecting a streak in a compressed image, comprising: an extraction system for extracting a DC value from each of a plurality of cell blocks in the compressed image; an identification system for identifying a peak DC value in each rank of cell blocks within the compressed image; and an analysis system for analyzing the peak DC values to determine if a streak exists in the compressed image.

In a second aspect, the invention provides a computer program product stored on a computer usable medium for detecting a streak in a compressed image, comprising: program code configured for extracting a DC value from each of a plurality of cell blocks in the compressed image; program code configured for identifying a peak DC value in each rank of cell blocks within the compressed image; and program code configured for analyzing the peak DC values to determine if a streak exists in the compressed image.

In a third aspect, the invention provides a method for detecting a streak in a compressed image, comprising: extracting a DC value from each of a plurality of cell blocks in the compressed image; identifying a peak DC value in each rank of cell blocks within the compressed image; and analyzing the peak DC values to determine if a streak exists in the compressed image.

In a fourth aspect, the invention provides deploying an application for detecting a streak in a compressed image, comprising: providing a computer infrastructure being operable to: extract a DC value from each of a plurality of cell blocks in the compressed image; identify a peak DC value in each rank of cell blocks within the compressed image; and analyze the peak DC values to determine if a streak exists in the compressed image.

In a fifth aspect, the invention provides computer software embodied in a propagated signal for detecting a streak in a compressed image, the computer software comprising instructions to cause a computer to perform the following functions: extract a DC value from each of a plurality of cell blocks in the compressed image; identify a peak DC value in each rank of cell blocks within the compressed image; and analyze the peak DC values to determine if a streak exists in the compressed image.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
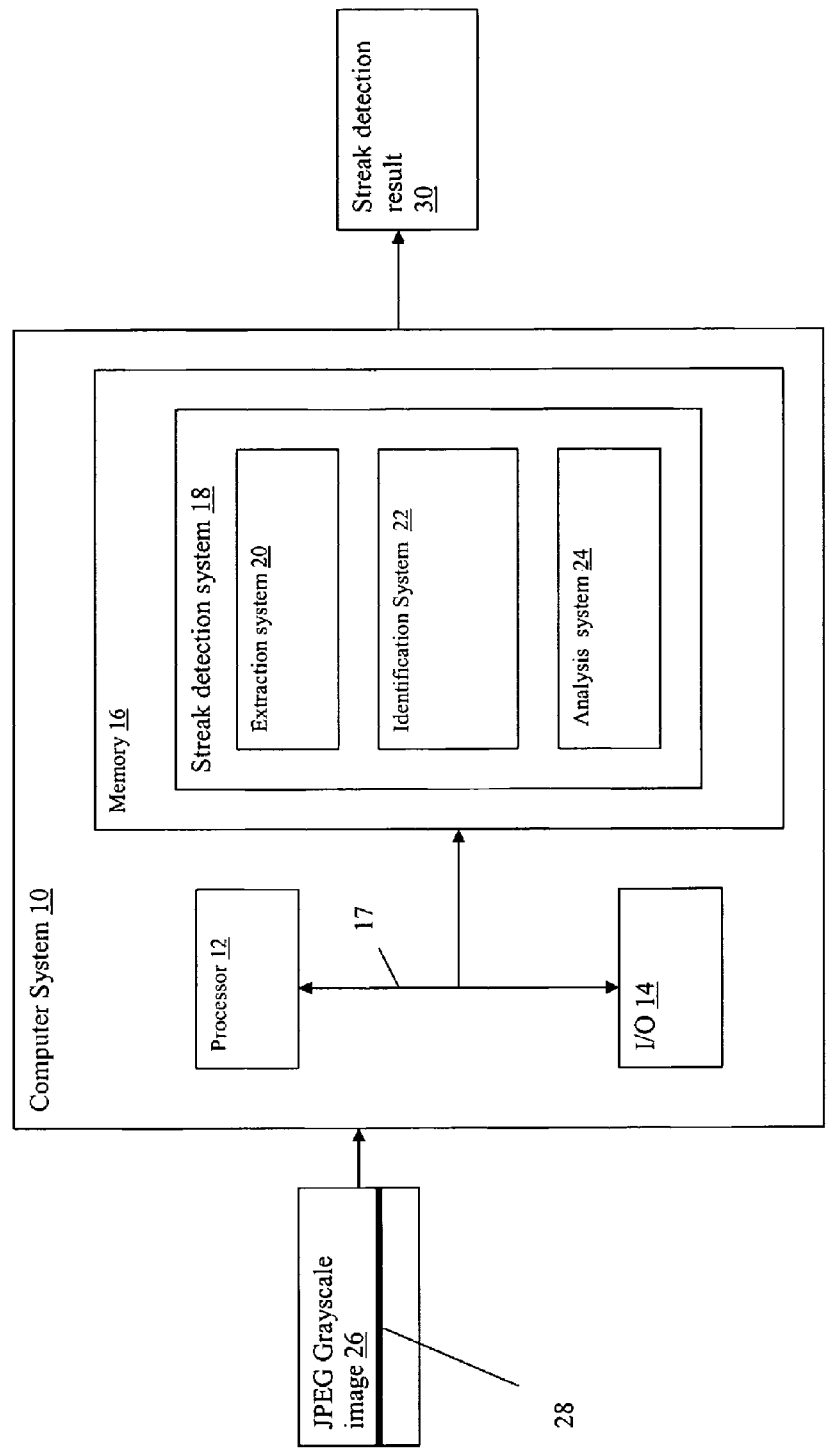
FIG. 1 depicts a computer system having a streak detection system in accordance with the present invention.

Referring now to the drawings, a computer system 10 is shown having a streak detection system 18 for determining if a JPEG gray scale image 26 includes a streak 28, and outputting a streak detection result 30, e.g., a yes, a no, a value, etc. In the examples described herein, JPEG gray scale image 26 comprises a document image, and more specifically a check image, however it should be understood that the techniques described herein could be applied to any image. Moreover, while the illustrative embodiments describe a system for analyzing JPEG gray scale images, the techniques described herein could be applied to any image format in which a whiteness value (i.e., a DC coefficient) can be readily extracted from a pixel cell block.

In this illustrative embodiment, streak detection system 18 comprises: an extraction system 20 for extracting a DCT[0] coefficient value from each cell block in the JPEG gray scale image 26; an identification system 22 for identifying the peak DCT[0] coefficient value in each "rank" (i.e., a row or column) of cell blocks aligned along the "direction of transport" of the imaged document; and an analysis system 24 for analyzing the identified set of peak DCT[0] coefficient values to determine if a streak exists. Systems 22, 24 and 26 are described in further detail below with reference to FIGS. 2-6.

Figure 3:
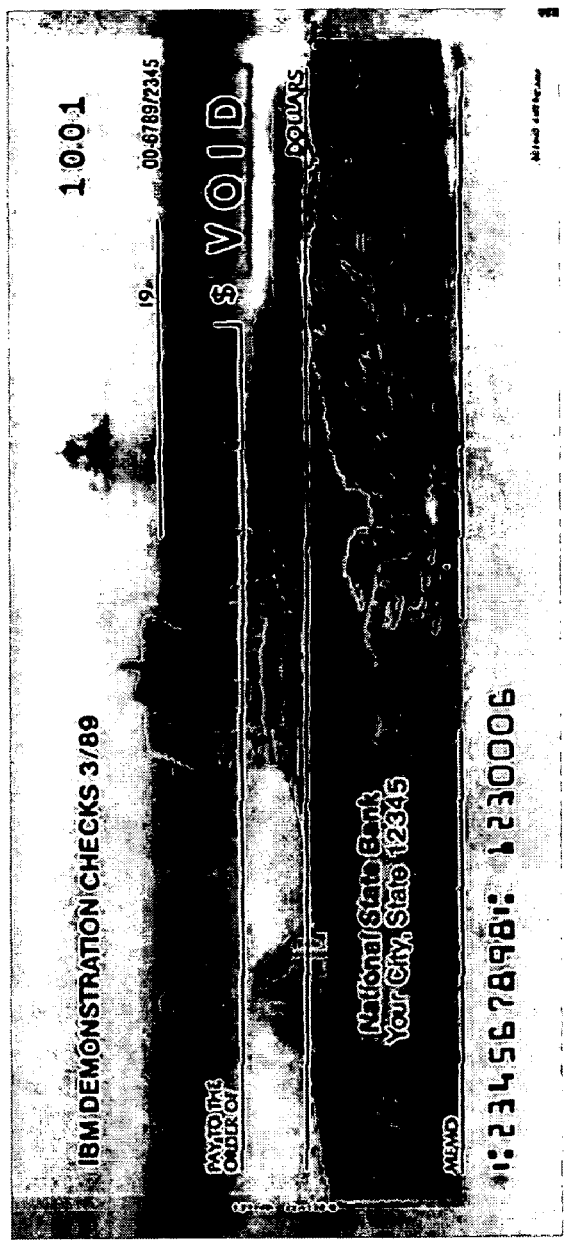
FIG. 3 depicts a check image having a streak.

Streaks typically appear on checks (and other such documents) along the "direction of transport." For instance, if a check is passed through a check processing device in a left-to-right horizontal manner, any streaking will typically appear horizontally across the check. An example of a JPEG check image 50 having a horizontal streak 52 is shown in FIG. 3.

In most instances, image data is stored in a compressed format, such as JPEG. As is known in the art, compression formats, such as JPEG, encode an image into cell blocks, e.g., comprising 8×8 pixels. Each cell block includes one DC component, DCT[0], and 63 AC components DCT[1]-DCT[63]. The 63 AC components comprise frequency information that allows the image to be compressed. The DC component contains a value that reflects an average "whiteness" of the cell block, i.e., the higher the DC value, the whiter or brighter the cell block. The present invention extracts and analyzes the DC components to determine whether a streak exists without having to totally decompress the image. Note that for the purposes of this disclosure the terms DC and DCT[0] are used interchangeably.

Figure 2:
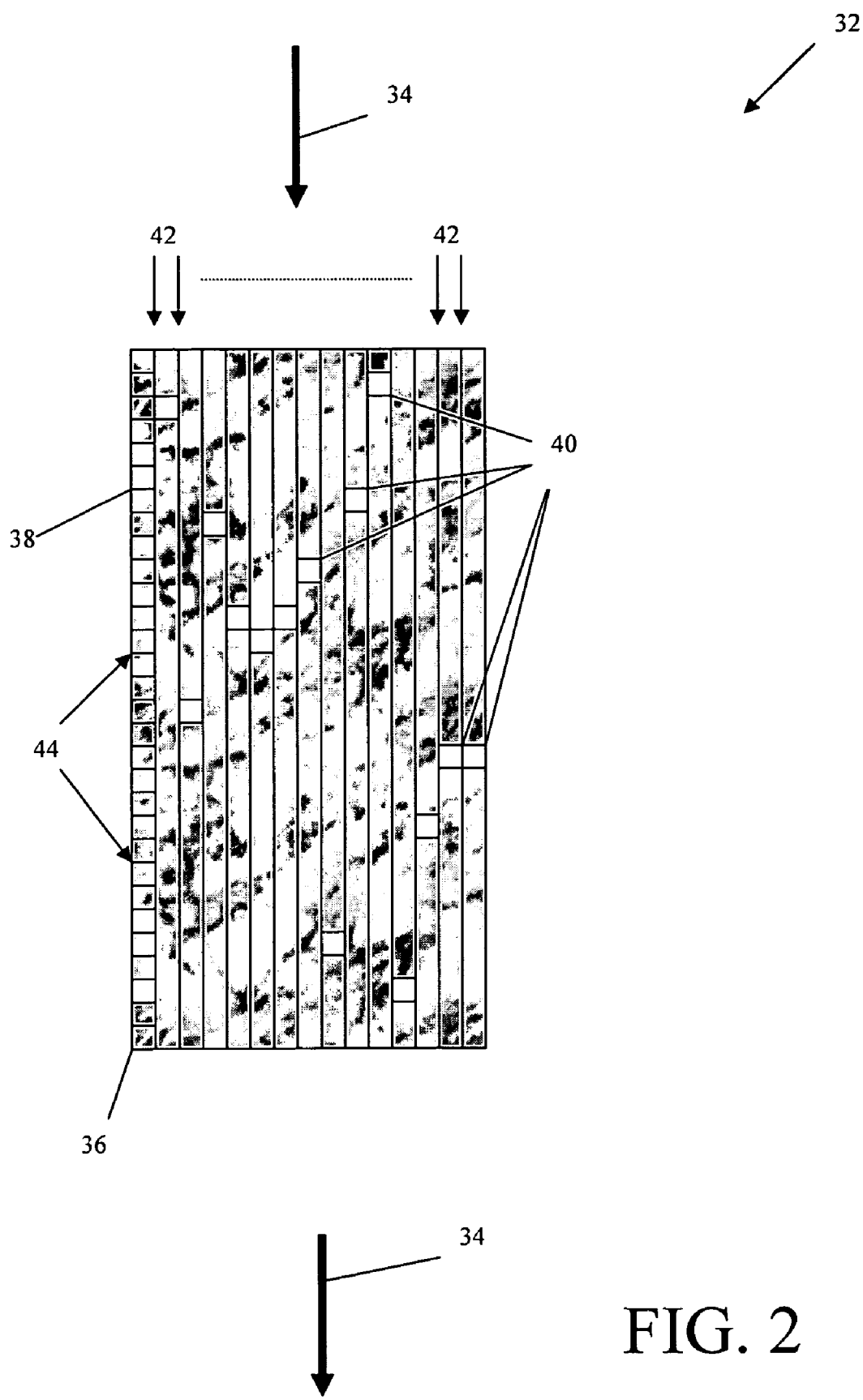
FIG. 2 depicts a document image being analyzed in accordance with the present invention.

FIG. 2 shows a document image 32 (e.g., a check) being analyzed in accordance with the present invention. (Note that the image 32 is vertically oriented only for the purposes of simplifying the explanation below.) In this example, the direction of transport is along arrows 34. Accordingly, any streaking on the image document 32 would be expected in the direction of arrows 34. To determine if any streaking exists, extraction system 20 first extracts a DCT[0] coefficient values from each cell block in the image 32. In this example, the image comprises 30×15 cell blocks, with illustrative cell blocks 44 being shown in the leftmost vertical rank, in this case column, 36. Extracting the DCT[0] coefficient value from each cell block of a JPEG image is a relatively simple process well understood in the art, requiring only a single decoding step.

Once the DCT[0] coefficient values are extracted, identification system 22 then identifies the largest DCT[0] coefficient value in each cell block rank 42, wherein a rank is a complete column or row of cell blocks oriented along the direction of transport. The largest DCT[0] coefficient value in each cell block rank 42 represents a "peak whiteness value" for the rank. For instance, in the illustration shown in FIG. 2, cell block 38 represents the whitest cell block in the leftmost cell block rank 36. Cell blocks 40 represent the whitest cell blocks in several of the other ranks 42. Once the whitest cell block in each rank 42 is identified, the DC values associated with those cell blocks can be analyzed by analysis system 24 to determine if a streak exists.

Figure 4:
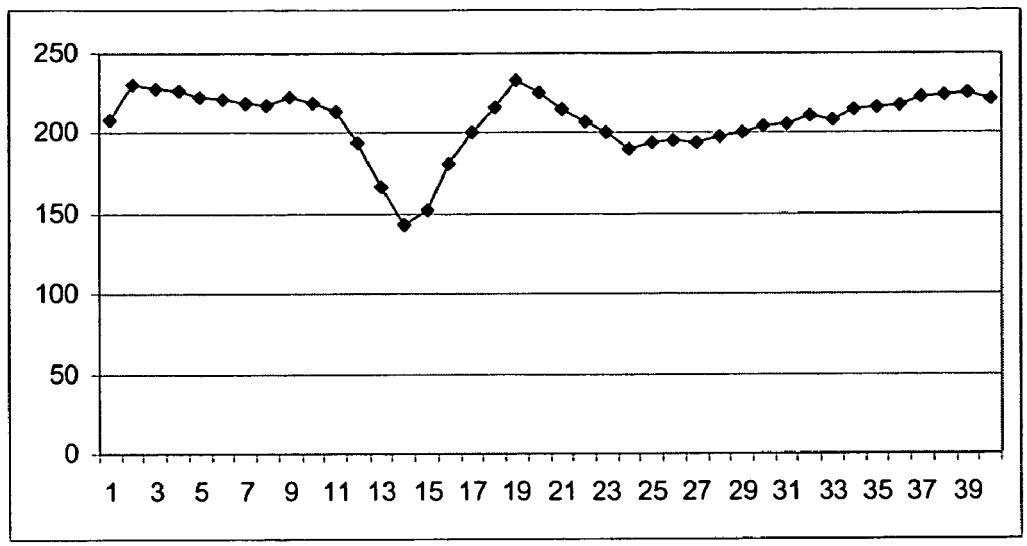
FIG. 4 depicts a plot of peak DCT[0] data gathered from the check image of FIG. 3 in accordance with the present invention.

FIGS. 3-6 provide an illustrative embodiment of an application of analysis system 24. As can be seen, FIG. 3 depicts a check image 50 (320 pixels wide by 720 pixels tall) having a streak 52. In the orientation shown, there are 40×90 JPEG cell blocks, 40 in the horizontal direction and 90 in the vertical direction (in this case, the direction of transport). For each rank of cell blocks oriented along the direction of transport, the highest DCT[0] coefficient value (i.e., the whitest cell) is identified and plotted, as shown in FIG. 4. These identified values form a set of peak DCT[0] coefficient values or peak whiteness levels. Thus, the plot of FIG. 4 shows a peak whiteness profile for each rank of cell blocks in the image 50. Note that the streak 52 in the check image 50 corresponds to a dip in the plot of the peak whiteness profile. Thus, an analysis of the plot indicates that there is a cluster of adjacent cell block ranks that have a peak whiteness level significantly less than rest of the check image, indicating a streak.

Figure 6:
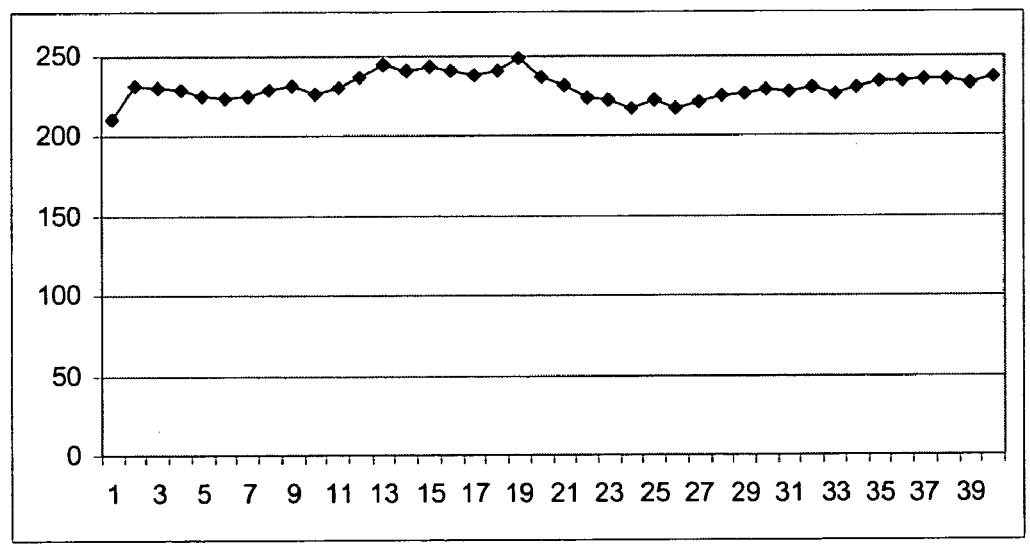
FIG. 6 depicts a plot of peak DCT[0] data gathered from the check image of FIG. 5 in accordance with the present invention.
Figure 5:
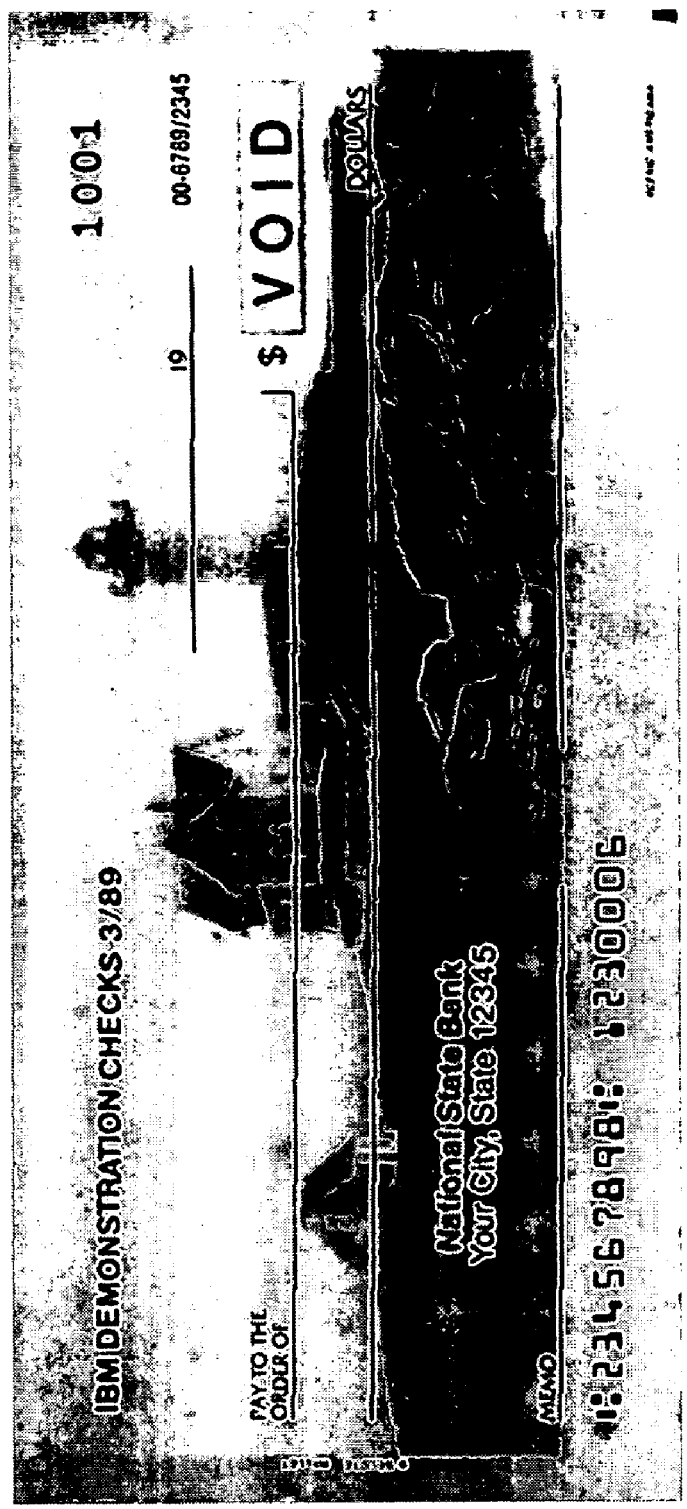
FIG. 5 depicts a check image without a streak.

FIG. 5 depicts a check image 60 that does not include a streak. As can be seen in the plot of FIG. 6, there are no significant peaks or valleys, indicating no streak.

Analysis system 24, which provides an automated process for identifying a streak from the set of peak DCT[0] coefficient values, could be implemented in any manner. In one illustrative embodiment, the presence/absence of a streak in the check image 50 is established as follows:

(1) For each of the 40 cell block ranks from which a peak DCT[0] coefficient value was obtained, discard the first and last four values to eliminate any edge effects contained in the image, e.g., black borders along the check image.

(2) Of the remaining 32 values, place them in the descending order of peak DCT[0] coefficient value.

(3) Ignore the highest four values, and take the average of the next four. Label this as the average video.

(4) A streak value (SV) is computed by taking the difference between the average video (AV) and the lowest DCT[0] coefficient value (LV), normalized with respect to the average video, i.e., SV=(AV−LV)/AV.

(5) The computed SV is then compared to a threshold value to determine if the image is streaky. For instance, if the SV is above a predetermined threshold of 0.20 (or 20%), then the image is considered streaky. If the SV is below 20%, then the image is considered non-streaky.

For the streaky and non-streak images shown images in FIGS. 3 and 5, the normalized values were 35% and 9%, respectively. Experimental results for another image pair (not shown) were 42% and 6%, respectively. Thus, a threshold for the normalized values, e.g., 20%, can be readily established to allow for easy discrimination between streaky and non-streaky images.

Note that this methodology is illustrative in nature, and not meant to be limiting to scope of the invention. Based on actual check stock, corresponding images and the tolerance for streak acceptance, the above can be modified to ensure proper streak detection.

Note that computer system 10 of FIG. 1 may comprise, e.g., a desktop, a laptop, a workstation, etc. Moreover, computer system 10 could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a streak detection system could be created, maintained and/or deployed by a service provider that offers the functions described herein for customers. That is, a service provider could offer to provide streak detection as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for detecting a streak in a compressed image, comprising: a processor, said processor performing the steps of extracting a DC value from each of a plurality of cell blocks in the compressed image; identifying a peak DC value in each rank of cell blocks within the compressed image; and analyzing the peak DC values to determine if a streak exists in the compressed image; wherein the step of analyzing the peak DC values calculates a streak value and compares the streak value to a threshold value to determine if a streak exists; the streak value computed according to the following steps: for each rank of the cell blocks from which a peak DC coefficient value was obtained, discard the first n and last m values to eliminate any edge effects, wherein n and m are predetermined integers; of the remaining peak DC coefficient values, place them in a descending order; ignore the highest four peak DC coefficient values, and compute an average of the next four highest peak DC coefficient values; compute the streak value as a difference between the computed average and a lowest peak DC coefficient value, normalized with respect to the computed average.

2. The method of claim 1, wherein the compressed image comprises a JPEG image.

3. The method of claim 1, wherein the compressed image comprises an image of a check.

4. The method of claim 3, wherein each rank of cell blocks is oriented along a direction of travel of the check.

5. The method of claim 1, wherein each rank of cell blocks comprises a row or column of cell blocks.

* * * * *